United States Patent
Umezawa

(10) Patent No.: US 9,918,458 B2
(45) Date of Patent: Mar. 20, 2018

(54) DOUBLE BEARING REEL

(71) Applicant: Globeride, Inc., Tokyo (JP)

(72) Inventor: Yuuichi Umezawa, Tokyo (JP)

(73) Assignee: GLOBERIDE INC., Tokyo (JP)

( * ) Notice: Subject to any disclaimer, the term of this patent is extended or adjusted under 35 U.S.C. 154(b) by 0 days.

(21) Appl. No.: 15/404,494

(22) Filed: Jan. 12, 2017

(65) Prior Publication Data

US 2017/0196211 A1 Jul. 13, 2017

(30) Foreign Application Priority Data

Jan. 13, 2016 (JP) .................................. 2016-004407

(51) Int. Cl.
| | | |
|---|---|---|
| *A01K 89/01* | (2006.01) | |
| *A01K 89/015* | (2006.01) | |
| *A01K 89/00* | (2006.01) | |
| *A01K 89/033* | (2006.01) | |

(52) U.S. Cl.
CPC ........ *A01K 89/0192* (2015.05); *A01K 89/004* (2015.05); *A01K 89/006* (2013.01); *A01K 89/033* (2013.01)

(58) Field of Classification Search
CPC ............ A01K 89/015; A01K 89/01921; A01K 89/01922; A01K 89/01923; A01K 89/033
See application file for complete search history.

(56) References Cited

U.S. PATENT DOCUMENTS

| | | | | |
|---|---|---|---|---|
| 5,127,603 A | * | 7/1992 | Morimoto | ............ A01K 89/015 242/279 |
| 5,577,680 A | * | 11/1996 | Ikuta | .................... A01K 89/015 242/288 |
| 5,873,535 A | * | 2/1999 | Jeung | .................... A01K 89/015 242/310 |
| 6,032,894 A | * | 3/2000 | Chapman | ............ A01K 89/015 242/310 |
| 6,367,726 B1 | * | 4/2002 | Hyon | .................... A01K 89/015 242/312 |

(Continued)

FOREIGN PATENT DOCUMENTS

| | | |
|---|---|---|
| JP | 3081499 | 8/2000 |
| JP | 2005-323586 | 11/2005 |

(Continued)

*Primary Examiner* — Emmanuel M Marcelo
(74) *Attorney, Agent, or Firm* — Pillsbury Winthrop Shaw Pittman, LLP

(57) ABSTRACT

One object is to provide a double bearing reel that provides a comfortable grip feeling in fishing and prevents the cover plates from making a malfunction. A double bearing reel of the present invention includes: a reel body including left and right side plates, each of the left and right side plates including a frame and a cover plate; a spool rotatably supported between the left and right side plates; a handle provided on one of the left and right side plates and configured to rotationally drive the spool; and an opening/closing mechanism configured to enable the cover plate on an opposite side to the handle to be opened and closed on the associated frame. An opening is formed in a side surface of the cover plate on the opposite side to the handle, and an operation member of the opening/closing mechanism is disposed within the opening.

7 Claims, 7 Drawing Sheets

(56) References Cited

U.S. PATENT DOCUMENTS

| | | | | |
|---|---|---|---|---|
| 6,464,158 | B1* | 10/2002 | Sakurai | A01K 89/006 242/283 |
| 7,789,336 | B1* | 9/2010 | Nakagawa | A01K 89/015 242/317 |
| 9,668,466 | B2* | 6/2017 | Sim | A01K 89/01921 |
| 2005/0056716 | A1* | 3/2005 | Kawasaki | A01K 89/015 242/310 |
| 2005/0224617 | A1 | 10/2005 | Nakagawa et al. | |
| 2006/0006267 | A1* | 1/2006 | Hirayama | A01K 89/015 242/223 |
| 2007/0246590 | A1* | 10/2007 | Hyun | A01K 89/015 242/310 |
| 2012/0056028 | A1* | 3/2012 | Kawasaki | A01K 89/033 242/267 |
| 2013/0320125 | A1* | 12/2013 | Hyun | A01K 89/015 242/312 |
| 2014/0158803 | A1* | 6/2014 | Hyun | A01K 89/015 242/310 |
| 2014/0263792 | A1* | 9/2014 | Takechi | A01K 89/015 242/257 |
| 2015/0076270 | A1* | 3/2015 | Ikebukuro | A01K 89/015 242/249 |
| 2016/0345562 | A1* | 12/2016 | Baldwin | A01K 89/01922 |
| 2016/0366866 | A1* | 12/2016 | Sim | A01K 89/01921 |

FOREIGN PATENT DOCUMENTS

| | | |
|---|---|---|
| JP | 2008-182915 | 8/2008 |
| JP | 2011-024527 | 2/2011 |

* cited by examiner

DOUBLE BEARING REEL

TECHNICAL FIELD

The present disclosure relates to a double bearing reel in which a spool for winding a fishing line is rotatably supported between side plates of a reel body.

BACKGROUND

A typical double bearing reel includes left and right side plates including a frame and left and right cover plates (left and right cover members) removably attached to the left and right sides of the frame, respectively. Between the left and right side plates, there is rotatably supported a spool for winding a fishing line. Upon winding operation of a handle disposed on one of the side plates, the spool is rotated to wind the fishing line. Between the frame and the cover plates, there are housed various functional components such as a drive force transmission mechanism for transmitting a rotational force of the handle to the spool and a brake force adjusting mechanism for adjusting a brake force imparted on the rotation of the spool. Since these functional components require maintenance, an opening/closing mechanism is provided on the frame and the cover plates so as to enable the cover plates to be removed, as disclosed in Patent Literatures 1 and 2.

The opening/closing mechanism is configured such that the cover plates can be released from the frame by operating an operation member such as a screw or a lever disposed on the cover plates. Patent Literature 1 discloses that a lever-type operation member is disposed on a lower rear portion of a cover plate on an opposite side to the handle. Patent Literature 2 discloses that a screw-type operation member is disposed on a lower front portion of a cover plate on an opposite side to the handle.

RELEVANT REFERENCES

List of Relevant Patent Literature

Patent Literature 1: Japanese Patent Application Publication No. 2005-323586
Patent Literature 2: Japanese Patent Application Publication No. 2011-24527

SUMMARY

When the above-described double bearing reel is used in fishing, various operations are possible; for example, the side plate on an opposite side to the handle may be gripped for winding operation of the handle, or the side plate on the handle side may be gripped for casting a tackle. Therefore, the side plates of the reel body have such a small sized as to facilitate gripping with the palm of a hand. Further, the operation members of the opening/closing mechanism of the above well known technique are suitably configured so as not to project from the side surface of the cover plate, thereby preventing uncomfortable grip feeling caused by the projection touched by the palm of a hand.

However, there are various ways of gripping the reel body in fishing, and the operation members may possibly be touched by portions of the fingers. That is, when the reel body is gripped, the portion from the lower front to the rear of the outer peripheral region of the side plates is contacted by a tip, belly, or root of a finger. Therefore, if an operation member of the opening/closing mechanism is disposed on this portion as in the above well known technique, there is possibility that a sense of discomfort and uncomfortable grip feeling occur, a pain is felt, or a malfunction occurs in the portions gripped by the palm or fingers.

The present invention is intended to overcome the above problem. One object of the present invention is to provide a double bearing reel that provides a comfortable grip feeling in fishing and prevents the cover plates from making a malfunction on the frame.

To achieve the above object, a double bearing reel of the present invention comprises: a reel body including left and right side plates, each of the left and right side plates including a frame and a cover plate attached to the frame; a spool rotatably supported between the left and right side plates; a handle provided on one of the left and right side plates and configured to rotationally drive the spool; and an opening/closing mechanism provided on the reel body and configured to enable the cover plate on an opposite side to the handle to be opened and closed on the associated frame, wherein an opening is formed in a side surface of the cover plate on the opposite side to the handle, and an operation member of the opening/closing mechanism is disposed within the opening.

In the above double bearing reel, an opening is formed in a side surface of the cover plate on the opposite side to the handle, and an operation member of the opening/closing mechanism for the cover plate is disposed within the opening. Therefore, when the cover plate is gripped for operation, no sense of discomfort is produced by the operation member. In addition, the operation member is disposed within the opening and is not exposed or projected from the lower edge region or the upper edge region of the outer peripheral region of the cover plate. Therefore, the operation member may not be contacted by the gripping portions of the palm or fingers, and there is less possibility that a sense of discomfort and uncomfortable grip feeling occur, a pain is felt, or a malfunction occurs in the portions gripped by the palm or fingers.

The present invention provides a double bearing reel that provides a comfortable grip feeling in fishing and prevents the cover plates from making a malfunction on the frame.

DESCRIPTION OF EXAMPLE EMBODIMENTS

Figure 1:
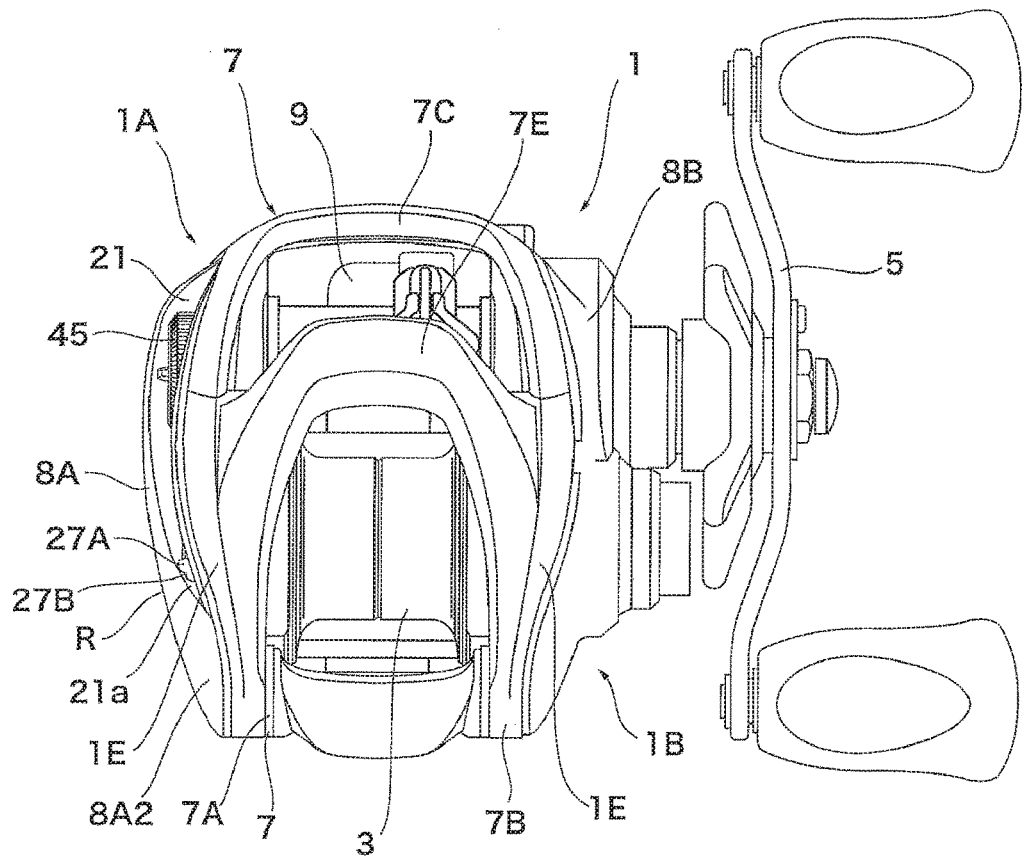
FIG. 1 is a plan view of a double bearing reel according to one embodiment of the disclosure.

A double bearing reel according to one embodiment of the disclosure will be now described with reference to FIGS. 1 to 5.

In the double bearing reel according to the embodiment, a reel body 1 may include a left side plate 1A, a right side plate 1B, and a spool 3 rotatably supported between the side plates 1A and 1B. In the embodiment, a handle 5 may be provided on the right side plate 1B side (a right handle type). When the handle 5 is rotated for winding operation, the spool 3 may be rotated via a drive force transmission mechanism (not shown) disposed inside the right side plate. It may also be possible that the handle 5 is provided on the left side plate side.

The reel body 1 may include a frame 7 and cover plates attached to the frame 7. The frame 7 and the cover plates may constitute left and right side plates 1A, 1B. The frame 7 may include a left frame 7A and a right frame 7B that may be integrated together. The left frame 7A may have a left cover plate 8A (a left cover member) attached thereto, and the right frame 7B may have a right cover plate 8B (a right cover member) attached thereto. That is, the left side plate (the side plate on the opposite side to the handle) 1A may include the left frame 7A and the left cover plate 8A attached thereto, and the right side plate (the side plate on the handle side) 1B may include the right frame 7B and the right cover plate 8B attached thereto.

The frame 7 may also include a plurality of connection portions that connect the left frame 7A and the right frame 7B, for example, a front connection portion 7C, a rear connection portion 7D, an upper connection portion 7E (which may also serve as a thumb rest), and a lower connection portion 7F. Of these connection portions, the lower connection portion 7F provided below the spool may have a reel leg 9 mounted thereon integrally (it may also be possible that the reel leg is formed integrally with the frame). The reel log 9 may be configured to be mounted on a reel seat of a fishing rod 70 (see FIGS. 6 and 7).

Figure 6:
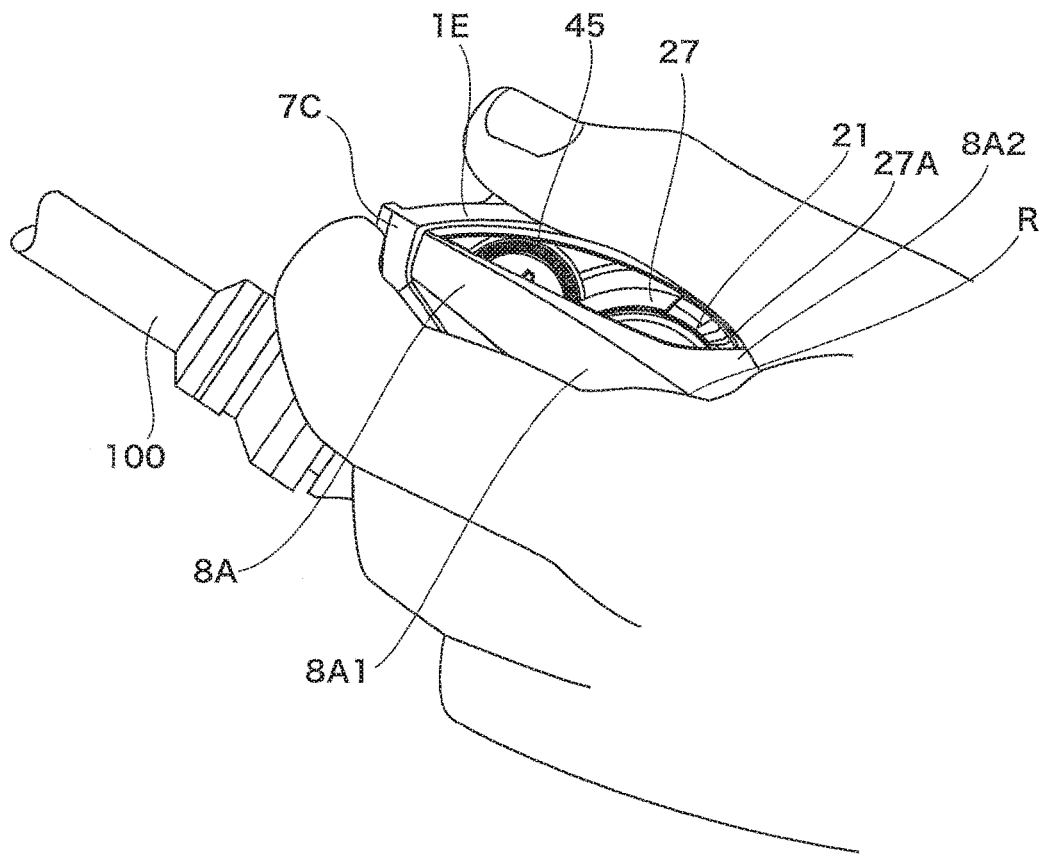
FIG. 6 illustrates the double bearing reel having the cover plate on the opposite side to the handle gripped by a left hand.

The shapes of the left and right side plates 1A, 1B are not particularly limited. In the embodiment, the left and right side plates 1A, 1B may have a non-circular shape (a substantially oval shape) with its outer periphery extending in the front-rear direction as viewed from a side (see FIG. 2). The surface (the side surface) of the side plate on the opposite side to the handle (the left cover plate) may be curved so as to be convex outward (in the axial direction of the spool shaft) such that the side plate can be easily wrapped in and gripped with the palm. In a vertically middle portion of the side plate, a ridge R may be formed to define a peaked portion of the curved surface along the front-rear direction. The side plate 1A may preferably have a front-rear length L of 65 to 75 mm and a height (a maximum height) H of 35 to 45 mm such that it can be gripped easily, the numerical ranges depending on the size of the palm of the user. That is, as shown in FIG. 6, the belly of the forefinger may be put on a region (a lower side surface 8A1) below the ridge R that constitutes the peaked portion of the curved surface, and the belly of the thumb may be put on an upper edge portion 1E (a surface region) of the left side plate. The side plate 1A as a whole may have such a shape that can be easily gripped with the palm of a left hand.

Figure 2:
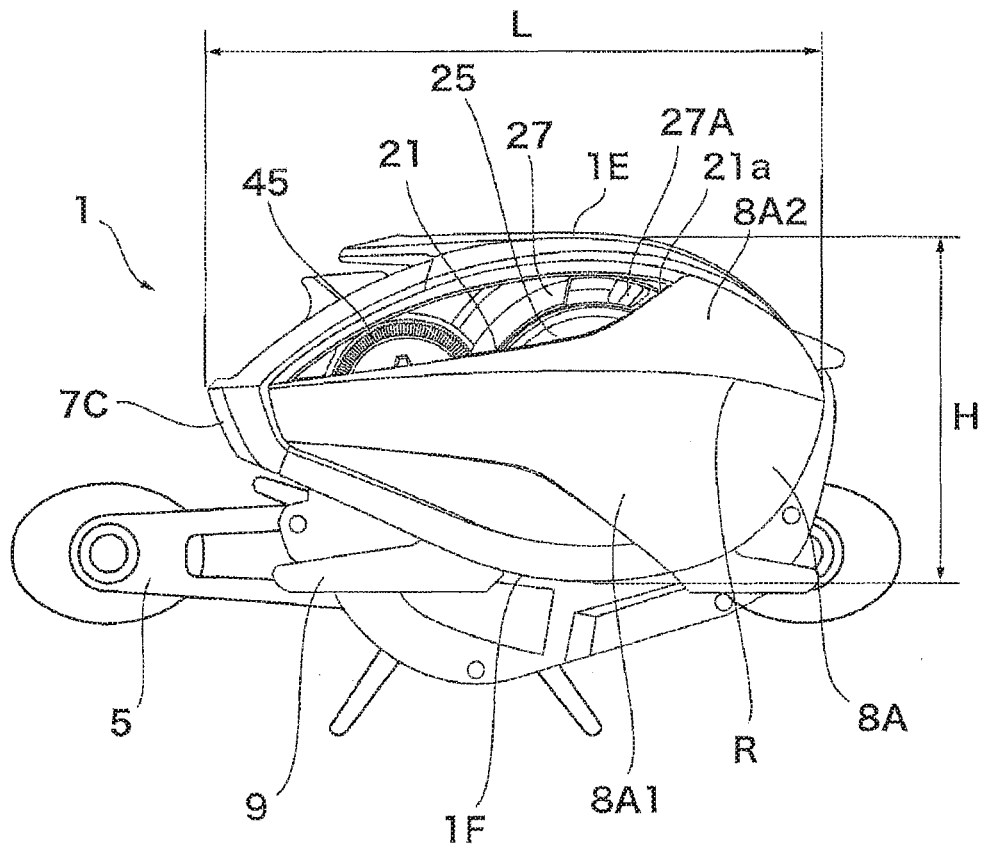
FIG. 2 is a side view of the double bearing reel of FIG. 1 as viewed from the side opposite to the handle thereof (the opening/closing mechanism is in a locked state).
Figure 3:
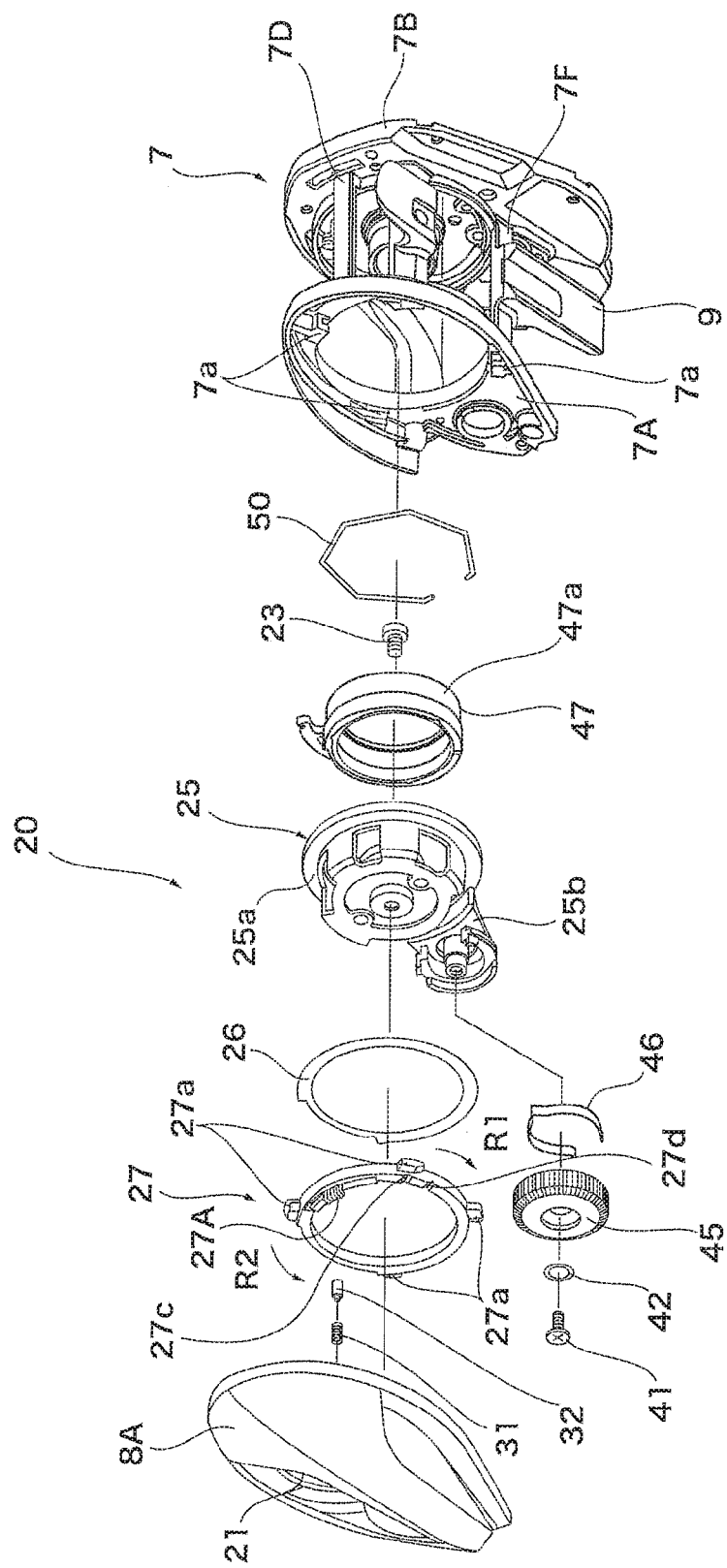
FIG. 3 is an exploded perspective view of an example of an opening/closing mechanism.

The left side plate 1A may preferably have flat outer peripheral surfaces (an upper edge portion 1E, a lower edge portion 1F). A flat surface refers to a surface including no portions partially projected from the surface (a surface having a flat shape and having no exposed projections such as an operation member of an opening/closing mechanism (described later)) (the flat surface may be curved). Since the side plate has flat outer peripheral surfaces, the side plate gripped with the palm may not catch the fingers thereon and thus may not produce uncomfortable grip feeling. In the embodiment, when the reel body is gripped with a left hand, the portion of the palm adjacent to the roots of fingers may contact the rear region of the left cover plate 8A, and the belly of the forefinger may contact the region below the ridge R (the lower side surface 8A1), as shown in FIGS. 2 and 6. At the same time, the belly of the thumb may contact the upper edge portion 1E of the side plate 1A, and the middle finger, the ring finger, and the little finger may contact the lower edge portion 1F of the side plate 1A.

The reel body may include an opening/closing mechanism 20 that enables the left cover plate 8A covering the left frame 7A to be opened and closed. The opening/closing mechanism 20 may include an operation member disposed in such a position that it can be operated with a finger. When the operation member is operated, the left cover plate 8A can be detached from the left frame 7A to expose the interior. The opening/closing mechanism 20 of the embodiment may be disposed between the left frame 7A and the left cover plate 8A. The opening/closing mechanism 20 of the embodiment will be described in detail below with reference to FIGS. 2 and 3.

The left cover plate 8A may have an opening 21 in the side surface thereof, and an operation member 27A of the opening/closing mechanism 20 may be disposed in the opening 21. The opening 21 may be formed through the left cover plate 8A. In the embodiment, the opening 21 may have an elongated shape and extend along the front-rear direction in the region above half the height H of the left cover plate 8A. In the embodiment, the left cover plate 8A may have the ridge R in the side surface thereof, as described above. The opening 21 may be formed above the ridge R (in the upper side surface 8A2).

The opening/closing mechanism 20 may have unit construction and may be mounted on the inner surface of the left cover plate 8A. The opening/closing mechanism 20 may include a set plate 25 and a rotation member 27. The set plate 25 may be fixed on the inner surface of the left cover plate 8A with a screw member 23. The rotation member 27 may have a ring shape and may be mounted on a zone-ring surface 25a on the left cover plate side via a washer 26.

The rotation member 27 may include engagement pieces that can be engaged with and disengaged from the left frame 7A. More specifically, a plurality of radially projecting projections (the engagement pieces) 27a may be provided at intervals on the outer peripheral surface of the rotation member 27 (in the embodiment, four projections may be provided at intervals of 90° along the circumferential direction). These projections 27a may be configured to be inserted into four recessed grooves 7a formed in the left frame 7A. When the rotation member 27 is rotated in one direction (the direction R1 in FIG. 3), the projections 27a may be inserted into associated recessed grooves 7a so as to fix the rotation member 27 on the left frame 7A. When the rotation member 27 is rotated in the other direction (the direction R2 in FIG. 3), the projections 27a may be disengaged from the associated recessed grooves 7a so as to unfix the rotation member 27 from the left frame 7A.

On the left cover plate side of the rotation member 27, there may be provided the operation member (the operation unit) 27A that may have a lever-like shape and may project toward the opening 21. The operation member 27A can be pressed with a finger (or pinched with fingers) to rotate the rotation member 27. When the set plate 25 is fastened integrally on the left cover plate 8A with the screw member 23, the operation unit 27A may be positioned within the opening 21 formed in the left cover plate 8A.

In the above arrangement, the rotation member 27 may be integrated with the set plate 25 into a unit. The screw member 23 may be screwed into the central portion of the set plate 25 from inside so as to fix the set plate 25 on the inner surface of the left cover plate and make the rotation member 27 rotatable. That is, when the operation unit 27A formed on the rotation member 27 is rotated (moved in the front-rear direction), the rotation member 27 can be moved circumferentially with respect to the set plate 25 and the left cover plate 8A fixed together.

A positioning means for setting a rotation position may preferably be provided on the rotation member 27. The positioning means may include, e.g., two recesses 27c, 27d and an engagement pin 32. The two recesses 27c, 27d may be formed along the circumferential direction, and the engagement pin 32 may be disposed in a sac hole (not shown) formed in the inner surface of the left cover plate 8A via a compression spring 31. More specifically, the recesses 27c, 27d may be positioned in association with the positions where the projections 27a formed on the outer peripheral surface are inserted into or disengaged from the recessed grooves 7a in the left frame 7A as the rotation member 27 is rotated by operation of the operation unit 27A. The engagement pin 32 may be biased elastically into the recesses 27c, 27d at these positions and engaged therewith. That is, the positioning means may be configured to set with click-stops the positions where the projections 27a of the rotation member 27 are inserted into or disengaged from the associated recessed grooves 7a.

Figure 5:
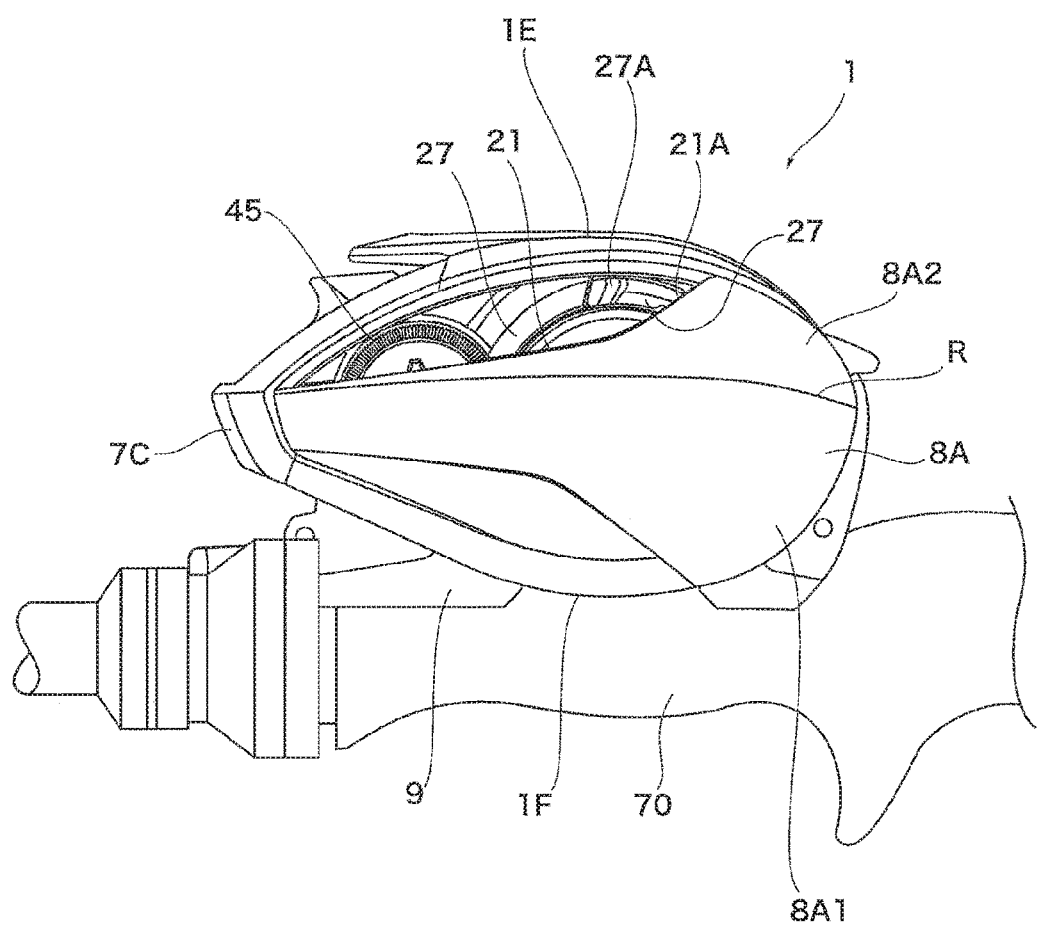
FIG. 5 is a side view of the double bearing reel of FIG. 1 viewed from the side opposite to the handle thereof (the opening/closing mechanism is in a released state).

With the above arrangement, when the operation unit 27A of the rotation member 27 is moved frontward in the direction R2 so as to position at the recess 27d the engagement pin 32 having been engaged with the recess 27c, the projections 27a of the rotation member 27 may be disengaged from the associated recessed grooves 7a, and the left cover plate 8A on which the set plate 25 is fixed may become removable from the frame 7 (the release state; see FIG. 5). When the left cover plate 8A is positioned at a predetermined position on the frame 7 and the operation unit 27A of the rotation member 27 is moved rearward in the direction R1 such that the engagement pin 32 is inserted into the recess 27c for positioning, the projections 27a of the rotation member 27 may be engaged with the associated recessed grooves 7a, and the left cover plate 8A may be mounted on the frame 7 (the locked state; see FIG. 2).

When the operation member 27A of the rotation member 27 is moved rearward for positioning, the operation member 27A may preferably be in a position adjacent to the rear end edge 21a of the opening 21. A palm and fingers of a hand holding the cover plate 8A are less apt to contact the region near the rear end edge 21a. Therefore, the operation unit 27A in the locked state may be positioned in this region to reduce the possibility of accidental unlocking. That is, there is less possibility of accidental unlocking while the reel is operated (held), as compared to the construction in which an operation member is moved frontward for locking.

Figure 4:
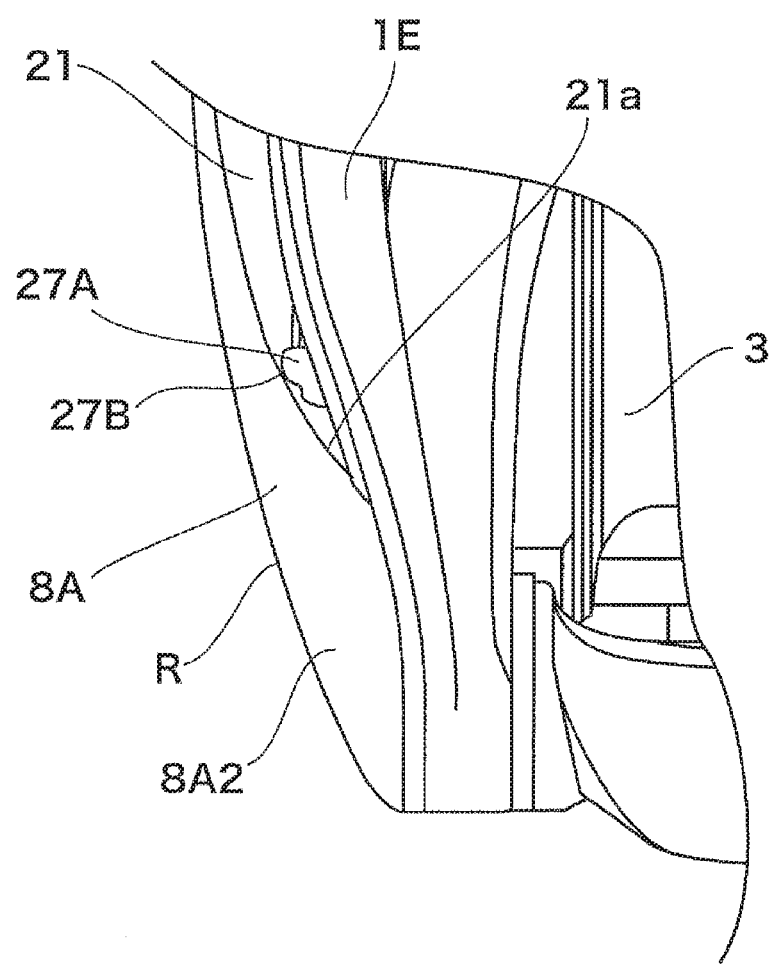
FIG. 4 is a plan view of a cover plate on the opposite side to the handle as view from behind the side plate.

The operation unit 27A may preferably have a stepped shape to facilitate moving operation. More specifically, the operation unit 27A may preferably include a step 27B (see FIG. 4) in which a front portion projects more than a rear portion. The step 27B may catch a finger pressing it from rear and facilitate unlocking operation. As described above, the operation unit 27A may be positioned within the opening 21. The opening 21 of the embodiment may be formed in a dead space (in a region of the upper side surface 8A2) scarcely contacted by fingers or the like of a hand actually holding the left cover plate during fishing (see FIGS. 6 and 7). Therefore, as shown in FIGS. 1 and 4, the distal end (the surface of the peak) 27B of the operation unit 27A positioned within the opening 21 may be either flush with or slightly beyond the surface of the left cover plate 8A (the surface of the upper side surface 8A2). Even when the operation unit 27A slightly projects beyond the surface, there is less possibility of erroneous operation because the operation unit 27A is positioned in a dead space. In actual operation, the operation unit 27A slightly projecting beyond the surface may be easy to press with a finger (or pinched with fingers), thus increasing the operability in removing the left cover plate 8A.

In this arrangement, the distal end (the surface of the peak) 27B of the operation unit 27A may preferably project beyond the surface of the left cover plate 8A by 1.0 mm or less to reduce the possibility of occurrence of a sense of discomfort or erroneous operation when the palm wraps the entirety of the left cover plate.

In the embodiment, a brake mechanism for applying a brake force to the rotation of the spool 3 may be provided on the set plate 25. The constitution of the brake mechanism is not particularly limited. For example, the brake mechanism may be based on magnetic braking for applying a brake force to the rotation of the spool shaft of the spool 3, as disclosed in Japanese Patent Application Publication No. 2011-10579. Such a brake mechanism based on the magnetic braking is well known, and the details thereof will be herein omitted. Briefly, as in the above publication, the brake mechanism may include an adjuster 45, a leaf spring 46, a magnet holder 47, etc. The adjuster 45 may be rotatably supported on the front extending portion 25b of the set plate 25 via a fastening screw 41 and a washer 42 so as to be disposed within the opening 21; the leaf spring 46 may be configured to produce a click sound when the adjuster 45 is rotated; and the magnet holder 47 may be rotationally driven via an interlocking gear (not shown) when the adjuster 45 is rotated.

The set plate 25 may have a first annular magnet (not shown) mounted thereon, and the magnet holder 47 may have a second annular magnet 47a mounted thereon. The second annular magnet 47a may be opposed to the first annular magnet with an annular gap maintained therebetween. On the spool shaft, there may be provided an annular electric conductor (not shown) configured to rotate integrally with the spool 3. This annular electric conductor may be disposed in the annular gap between the first annular magnet and the second annular magnet. When the adjuster 45 is rotated, the relative positions of the first annular magnet and the second annular magnet may be varied, thereby steplessly varying the intensity of the magnetic field in the annular gap and adjusting the brake force applied to the electric conductor (the spool) positioned in the annular gap. The magnet holder 47 may be fixed on the set plate 25 with a retaining ring 50 so as not to come off.

The position of the adjuster 45 of the brake mechanism is not particularly limited. In view of the positional relationship with the opening/closing mechanism 20, it may be preferable that the adjuster 45 is positioned in the front side of the opening 21, and the operation member (the operation unit 27A) of the opening/closing mechanism 20 is positioned in the rear side of the opening 21. That is, the adjuster 45 of the brake mechanism, which may be operated during fishing, may preferably be disposed in the front side of the opening 21 so as to be contacted and rotationally operated with ease by the forefinger of a left hand holding the side plate, while the operation unit 27A of the opening/closing mechanism 20, which may not be operated during fishing, may preferably be disposed in the rear side so as not to be easily contacted by fingers.

Figure 7:
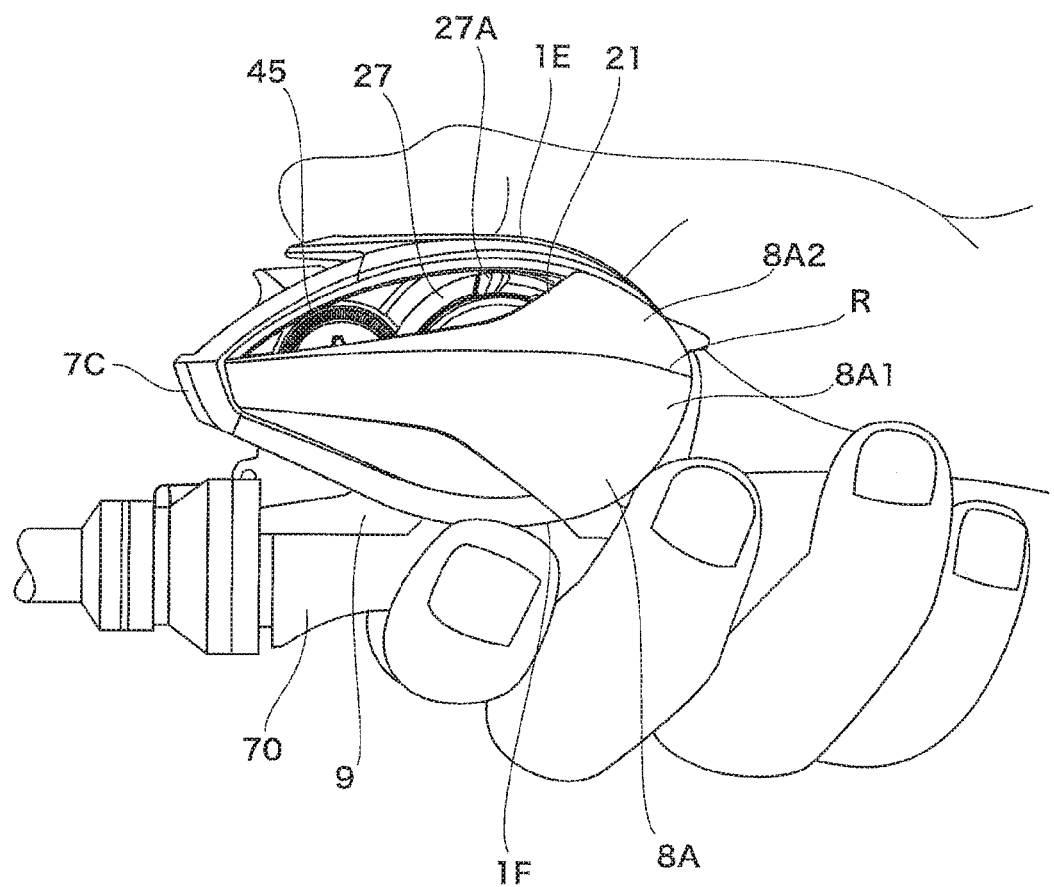
FIG. 7 illustrates the double bearing reel having the cover plate on the handle side gripped by a right hand.

In the double bearing reel constructed as described above, the opening 21 may be formed in the side surface of the left cover plate 8A on the opposite side to the handle, and the operation member 27A of the opening/closing mechanism 20 of the left cover plate 8A may be disposed within the opening. Therefore, when the left cover plate is gripped and the side surface is contacted by the palm, the gripping portions of the palm and the fingers may not contact the operation member, causing no uncomfortable grip feeling. More specifically, when the left cover plate is held by a left hand as shown in FIG. 6, or when the right cover plate is held by a right hand as shown in FIG. 7, the finger tips may contact with the upper edge portion 1E and the lower edge portion 1F constituting the flat surface region (the outer peripheral surface) of the side plate. In these portions, the operation member may not be exposed, no sense of discomfort occurs because of the flatness, and further, no malfunction may be caused by contact of fingers.

In the embodiment, the side plates may have a non-circular shape. When a side plate is gripped, the upper portion of the side surface of the side plate may constitute a so-called dead space that may not be contacted by the fingers or the palm. Therefore, the opening 21 may be formed in the upper portion. More specifically, the opening 21 may have an elongated shape and extend along the front-rear direction in the region above half the height H of the left cover plate 8A. Since the operation member 27A is disposed in this region as shown in FIG. 6, there may be no impact on the grip feeling of the palm.

Further, in the embodiment, the left cover plate 8A may have an outer surface thereof curved so as to be convexed outward, the ridge R formed in the middle portion thereof so as to define the peak of the curved surface along the front-rear direction, and an opening 21 formed above the ridge R (in the upper side surface 8A). Therefore, when the left side plate is held, the belly of the forefinger can be easily contacted with the region below the ridge R. The forefinger and the thumb can be positioned stably, and thus the left side plate 8A can be held stably.

Embodiments of the present invention are not limited to the above descriptions and are susceptible to various modifications. The shapes of the cover plates included in the side plates are not particularly limited and may be circular, for example. In addition, the position and the shape of the opening formed in the cover plate are also not particularly limited. It may also be possible that the opening is formed in a region to be covered with the palm of a hand holding the side plate. In such arrangement, the operation member of the opening/closing mechanism may preferably be not projected from the side surface of the cover plate. Further, the opening may be formed to extend through the cover plate, and it may also be possible that a part of the opening has a bottom and the other part extends through the cover plate, or the entirety of the opening has a bottom.

It may also be possible that the operation member of the opening/closing mechanism 20 is operated against a biasing force for example, instead of being a lever to be rotationally operated in the front-rear direction. Since such arrangement facilitates unlocking, the peak of the operation member disposed within the opening may preferably be positioned inside the surface of the cover plate.

It may also be possible that only the operation member of the opening/closing mechanism is disposed within the opening formed in the cover plate. In the embodiment, the operation member may be either slid straightly in the front-rear direction or slid in the top-bottom direction. Further, the operation member positioned within the opening may be disposed in a position away from the edges defining the opening, for example, in the middle region of the opening. Still further, it may also be possible that the operation member is a push button that can be operated within the opening.

In addition, the construction of the brake mechanism for the spool may not be particularly limited, but it may be preferable that the brake mechanism is built in the set plate 25 as a unit construction for facilitating build-in operation and maintenance, as in the embodiment.

LIST OF REFERENCE NUMBERS 1 reel body
1A, 1B side plates
3 spool
5 handle
7 frame
8A, 8B cover plates
20 opening/closing mechanism
21 opening
27 rotation member
27A operation unit (operation member)
45 adjuster member

What is claimed is:

1. A double bearing reel comprising:
a reel body including left and right side plates, each of the left and right side plates including a frame and a cover plate attached to the frame;
a spool rotatably supported between the left and right side plates;
a handle provided on one of the left and right side plates and configured to rotationally drive the spool; and
an opening/closing mechanism provided on the reel body and configured to enable the cover plate of another one of the left and right side plates to be opened and closed on the associated frame,
wherein an opening is formed in a side surface of the cover plate of said another one of the left and right side plates, and an operation member of the opening/closing mechanism is disposed within the opening, and
wherein the operation member of the opening/closing mechanism has a lever configuration and is capable of being moved in a front-rear direction, and a peak of the operation member is either flush with or slightly beyond a surface of the cover plate of said another one of the left and right side plates.

2. The double bearing reel of claim 1, wherein
the opening extends through the cover plate of said another one of the left and right side plates, and
the opening is formed in a region above half a height H of the cover plate of said another one of the left and right side plates.

3. The double bearing reel of claim 1, wherein when the operation member is moved forward, the opening/closing mechanism releases the cover plate of said another one of the left and right side plates, and when the operation member is moved backward, the opening/closing mechanism locks the cover plate of said another one of the left and right side plates.

4. The double bearing reel of claim 1, wherein
the opening has an elongated shape and extends along the front-rear direction, and an adjuster of a brake mechanism is disposed in a front side of the opening, and the operation member of the opening/closing mechanism is disposed in a rear side of the opening, the brake mechanism being configured to apply a brake force to a rotation of the spool.

5. The double bearing reel of claim 1, wherein
an outer surface of the cover plate of said another one of the left and right side plates is curved so as to be convexed outward, and a ridge is formed in a middle portion of the cover plate of said another one of the left and right side plates so as to define a peak of the curved outer surface along the front-rear direction, and
the opening is formed above the ridge.

6. A double bearing reel comprising:
a reel body including left and right side plates, each of the left and right side plates including a frame and a cover plate attached to the frame;
a spool rotatably supported between the left and right side plates;
a handle provided on one of the left and right side plates and configured to rotationally drive the spool; and
an opening/closing mechanism provided on the reel body and configured to enable the cover plate of another one of the left and right side plates to be opened and closed on the associated frame,
wherein an opening is formed in a side surface of the cover plate of said another one of the left and right side plates, and an operation member of the opening/closing mechanism is disposed within the opening, and
the opening has an elongated shape and extends along a front-rear direction, and an adjuster of a brake mechanism is disposed in a front side of the opening, and the operation member of the opening/closing mechanism is disposed in a rear side of the opening, the brake mechanism being configured to apply a brake force to a rotation of the spool.

7. A double bearing reel comprising:
a reel body including left and right side plates, each of the left and right side plates including a frame and a cover plate attached to the frame;
a spool rotatably supported between the left and right side plates;
a handle provided on one of the left and right side plates and configured to rotationally drive the spool; and
an opening/closing mechanism provided on the reel body and configured to enable the cover plate of another one of the left and right side plates to be opened and closed on the associated frame,
wherein an opening is formed in a side surface of the cover plate of said another one of the left and right side plates, and an operation member of the opening/closing mechanism is disposed within the opening, and
an outer surface of the cover plate of said another one of the left and right side plates is curved so as to be convexed outward, and a ridge is formed in a middle portion of the cover plate of said another one of the left and right side plates so as to define a peak of the curved outer surface along a front-rear direction, and
the opening is formed above the ridge.

* * * * *